United States Patent [19]

Bauer et al.

[11] 4,137,228
[45] Jan. 30, 1979

[54] WATER-SOLUBLE, COPPER CONTAINING TRISAZO COMPOUNDS HAVING A 2-(4'PHENYLENE)-BENZIMIDAZOYL-(5 OR 6),-BENZOXAZOLYL-(5), OR -BENZTHIAZOLYL-(5) COMPONENT

[75] Inventors: Wolfgang Bauer, Maintal; Joachim Ribka, Offenbach (Main)-Bürgel, both of Germany

[73] Assignee: Cassella Aktiengesellschaft, Frankfurt, Fed. Rep. of Germany

[21] Appl. No.: 745,177

[22] Filed: Nov. 26, 1976

[30] Foreign Application Priority Data

Nov. 27, 1975 [DE] Fed. Rep. of Germany ....... 2553261

[51] Int. Cl.² ............ C09B 45/28; C09B 45/48; C09B 35/34; C09B 35/38
[52] U.S. Cl. .......... 260/146 R; 260/145 C; 260/147; 260/149; 260/151; 260/155; 260/156; 260/157; 260/158; 260/159; 260/160; 260/196; 260/200; 260/201; 260/205; 260/206; 260/207; 260/207.1; 260/304 P; 260/307 D; 548/330
[58] Field of Search ........... 260/145 C, 146 R, 147

[56] References Cited

U.S. PATENT DOCUMENTS 2,870,135  1/1959  Senn ................... 260/145 C

FOREIGN PATENT DOCUMENTS 1151622   7/1963  Fed. Rep. of Germany ...... 260/146 R
1219145   6/1966  Fed. Rep. of Germany ...... 260/146 R
7505738  11/1975  Netherlands ..................... 260/157

*Primary Examiner*—Charles F. Warren
*Attorney, Agent, or Firm*—Connolly and Hutz

[57] ABSTRACT

Trisazo dyes of high tinctorial strength and excellent fastness have the structure

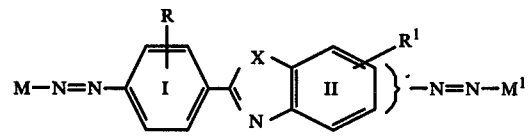

where one of M and $M^1$ is

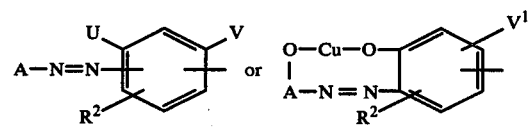

as more fully set out below.

12 Claims, No Drawings

WATER-SOLUBLE, COPPER CONTAINING TRISAZO COMPOUNDS HAVING A 2-(4'PHENYLENE)-BENZIMIDAZOYL-(5 OR 6),-BENZOXAZOLYL-(5), OR -BENZTHIAZOLYL-(5) COMPONENT

The present invention relates to water-soluble dyes particularly suitable for direct dyeing of cotton, regenerated cellulose and other fibers which contain hydroxyl or amide groups, such as wool, silk, polyamide and leather.

Among the objects of the present invention is the provision of novel dyes of the foregoing type that have a particularly high tinctorial strength as well as excellent fastness.

Additional objects of the present invention include improved dyeings made possible by the novel dyes.

The foregoing as well as additional objects of the present invention are more fully set out in the following description of particularly desirable exemplifications.

It has been discovered that dyes with the abovementioned desirable features have the formula

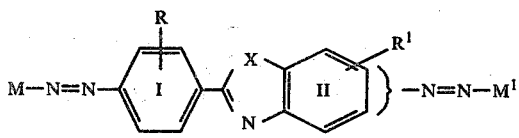

where one of M and $M^1$ is

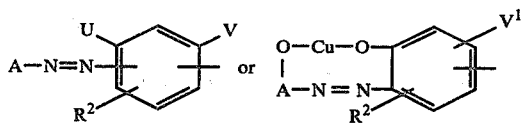

and the other is a coupling component of the class consisting of those having a carbocyclic or heterocyclic six-membered aromatic ring having six carbon atoms or 5 carbon atoms and one nitrogen atom in which a ring carbon is directly bonded to the azo bridge, a pyrazolone (5) directly bonded to the 4-position, a 6-hydroxypyridone (2) directly bonded to the 5-position, and an acetoacetoarylamide having the carbon between the carbonyls of the aceto groups directly bonded to the azo bridge, X is

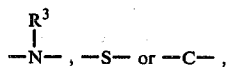

R and $R^1$ are selected from the class consisting of hydrogen and auxochrome substituents, $R^2$ being hydrogen, lower alkyl, lower alkoxy, sulfo, $-NO_2$ or halogen, $R^3$ being hydrogen, lower alkyl, phenyl or benzyl, A being a diazo component having a carbon-containing aromatic ring in which a ring carbon is directly bonded to the azo bridge, U, V and $V^1$ independently being —OH or $NR^4R^5$ and $V^1$ being meta to the copper-containing bridge, each $R^4$ and $R^5$ independently being hydrogen, carboxyalkyl, sulfoalkyl or hydroxyalkyl in each of which the alkyl has up to two carbons, lower alkyl, phenyl or lower alkylcarbonyl, and the dye contains at least one sulfo or carboxy group. The bracket in the formula means that the azo bridge to its right is bonded to the 5- or 6-position of the fused-ring nucleus, that is to a position on its carbocyclic ring which is not vicinal to its heterocyclic ring. Lower alkyl, lower alkoxy and the like refer to alkyls, alkoxy and the like in which the alkyl groups have up to four carbons. The sulfo and carboxy groups can be present in acid or salt forms.

Such dyes are soluble in water, with or without the help of a little alkali like sodium, potassium or ammonium hydroxides, carbonates or phosphates at least to the extent of about 1 gram per liter at room temperature. Because of the high color intensity imparted to the above-listed fibers by the dyes of the present invention such degree of water-solubility is sufficient to obtain full dyeings. It is accordingly preferred that the dyes of the present invention have no more than three water-solubilizing groups such as sulfo or carboxy, per dye molecule.

A desirable category of the foregoing dyes has the diazo component A in the form of a benzene, naphthalene or benzthiazole diazo component such as for example 2-phenyl-6-methyl-benzthiazole, where the dye does not have the oxygen-copper bridge. Where such bridge is present, the diazo component A is preferably a benzene or naphthalene diazo component.

For the copper free dye, diazo component A is preferably mono- or poly-substituted by lower alkyl, lower alkoxy, hydroxy, cyano, nitro, sulfo, carboxy, halogen, lower alkoxycarbonyl, lower alkanoyl, aroyl such as benzoyl, phenylamino, lower alkylcarbonylamino, lower alkylsulfonylamino or carbonamide. More than two such substituents are not particularly helpful, but can be used. Thus a phenyl of α- or β-naphthyl diazo radical can be mono-substituted or di-substituted by alkyl or alkoxy, each having 1 to 4 C atoms, hydroxyl, cyano, nitro, sulfo, carboxyl, chlorine, bromine, alkoxycarbonyl having 2 to 5 C atoms, alkanoyl having 1 to 4 C atoms, benzoyl, phenylamino the phenyl of which can be substituted by nitro and/or sulfo, alkanoylamino having 2 to 5 C atoms, benzoylamino, carbonamide which can be mono-substituted or di-substituted on the nitrogen by alkyl having 1 to 4 C atoms or by phenyl, or sulfonamide which can be mono-substituted or di-substituted on the nitrogen by alkyl having 1 to 4 C atoms. Nitro, chlorine, sulfo, carboxyl, alkyl and alkoxy having 1 to 2 C atoms, hydroxyl cyano or alkanoylamino groups having 2 to 5 C atoms such as acetylamino, are particularly suitable substituents. Chlorine and/or nitro and/or sulfo and/or alkyl having 1 to 2 C atoms and/or carboxyl and/or hydroxyl, are especially desirable for di-substitution of a phenyl or α- or β-naphthyl diazo radical. For tri-substitution of such radical, chlorine and/or sulfo and/or hydroxyl are most desirable. Particularly preferred copper-free dyes of the present invention have a phenyl or α- or β-naphthyl diazo radical which is mono-substituted by sulfo, carboxyl, hydroxyl or acetylamino, or is di-substituted by sulfo and/or carboxyl and/or hydroxyl, or is tri-substituted by 1 to 3 sulfo groups and/or 1 or 2 hydroxyl groups.

Alkyl groups which have 1 to 4 C atoms and which are suitable substituents for the diazo component are methyl, ethyl, 1-propyl, 2-propyl, 1-butyl, 2-butyl, 2-methyl-1-propyl and tert.-butyl. Alkoxy groups having 1 to 4 C atoms and which are suitable substituents are, for example, methoxy, ethoxy, propoxy, isopropoxy, but-1-oxy, but-2-oxy, isobutoxy and tert.-butoxy. Alkanoylamino groups having 2 to 5 C atoms and which are suitable substituents are formylamino, acetylamino, propionylamino, butyrylamino, isobutyrylamino and valeroylamino.

A 2-benzthiazole radical is a preferred benzthiazoyl diazo component and it is preferably mono-substituted in the 6-position by nitro, chlorine, sulfo, carboxyl, alkyl or alkoxy having 1 to 4 C atoms, hydroxyl or alkylcarbonylamino having 2 to 5 C atoms. Of these nitro, chlorine, sulfo, alkyl or alkoxy having 1 or 2 C atoms, or acetylamino are the most preferred substituents.

The diazo component can also have the formula

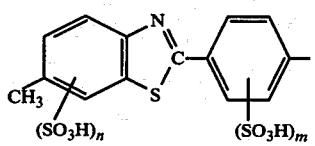

wherein $n$ and $m$ can denote the numbers 0 or 1, and $n$ is equal to or greater than $m$ in every case. This means that the phenyl nuclei can be unsubstituted, or contains one sulfo group which is then located in the fused phenyl ring, or contains two sulfo groups, one in each phenyl ring.

The two azo bridges which are linked to the phenyl nucleus carrying U and V are preferably in the ortho- or para-position with respect to these substituents unless such a position is blocked by $R^2$. These bridges are most preferably both in the para-positions to the substituents U and V, in either order. However when the dyes are prepared isomeric coupling takes place so that mixture of isomeric dyes are formed.

The copper-containing dyes of the present invention preferably have as their diazo component A, a 1,2-phenylene, 1,2-naphthylene or 2,3-naphthylene radical which can additionally be mono-substituted or di-substituted by chlorine, $-SO_3H$, $-CO_2H$, $-SO_2NH_2$, $-SO_2NHCH_3$, $-SO_2N(CH_3)_2$, $-SO_2N(C_2H_5)_2$, nitro or alkyl having 1 to 2 C atoms. Chlorine, nitro, $-SO_3H$, $-COOH$, $-SO_2NH_2$ or alkyl having 1 to 2 C atoms, are especially preferred. Copper containing dyes according to the present invention in which A is a 1,2-phenylene radical which is unsubstituted or is mono-substituted by $-SO_3H$ or $-SO_2NH_2$, are particularly advantageous industrially.

The coupling component M or $M^1$ contained in both the copper-free and the copper-containing dyes according to the present invention, are desirably benzene, naphthalene, 6-hydroxypyridone, pyrazolone, acetoacetarylide, 2,4-dihydroxyquinoline, or 2,6-diaminopyridine coupling components.

Thus this coupling component can be a phenyl or an α- or β-naphthyl that contains one or two hydroxy and/or $-NR^6R^7$ groups and, additionally, up to two substituents selected from the class consisting of lower alkyl, lower alkoxy, carboxy, sulfo, chloro, bromo, nitro, lower alkoxycarbonyl, $R^6$ and $R^7$ being independently hydrogen, lower alkyl, aryl having up to 12 carbons, lower alkyl carbonyl, carboxy lower alkyl, sulfo lower alkyl, hydroxy lower alkyl.

Preferred 6-hydroxypyridone coupling components have the formula

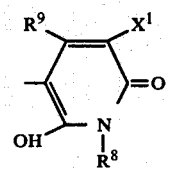

$R^8$ being hydrogen or alkyl having up to 8 carbons,
$R^9$ being hydrogen or lower alkyl, and
$X^1$ being $-CN$, carboxy, $-CONH_2$, or sulfo.

Particularly valuable dyestuffs of the present invention are those preferred 6-hydroxypyridone derivatives in which $R^8$ is hydrogen or methyl and $X^1$ is $-CN$ or $-SO_3H$.

Desirable pyrazolone coupling components have the formula

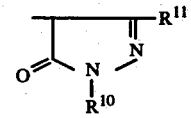

where
$R^{10}$ is hydrogen, unsubstituted phenyl, or phenyl having up to two substituents selected from the class consisting of methyl, nitro, chloro and sulfo, and
$R^{11}$ is methyl, carboxy, or lower alkoxycarbonyl.

Acetoacetoarylamides coupling components having the formula

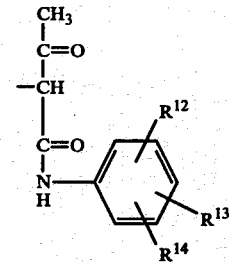

where
$R^{12}$ and $R^{13}$ are independently selected from the class consisting of hydrogen, methyl, methoxy, chloro, carboxy and sulfo, and
$R^{14}$ is hydrogen, methyl or methoxy are quite effective.

The coupling component can also be a 2,4-dihydroxy-2-quinolyl or 2,6-diamino-5-pyridyl radical.

Preferred U and V substituents are those in which $R^4$ is hydrogen, phenyl, hydroxyalkyl, carboxyalkyl or sulfoalkyl, the alkyl in each case having 1 or 2 C atoms, and $R^5$ is hydrogen.

Copper-containing dyes of the present invention in which $V^1$ is a hydroxyl group are also preferred.

As noted above, mixtures of dyes which are structurally isomeric with one another may be formed when the dyes of the present invention are prepared, and such mixtures are about as effective as the pure dyes of the present invention. Also the dyes need not be carefully purified, and indeed can generally be used in the crude condition in which they are recovered from the reaction mixtures in which they are formed.

Desirable R and R¹ substituents are identical or different alkyls and/or alkoxys, having in each case 1 or 2 C atoms, and/or halogen. Preferred dyestuffs according to the present invention are those in which R and R¹ are a methyl group or chlorine.

Metal-free or copper-containing dyes according to the present invention, in which X is -NH-, are particularly preferred.

The dyes of the present invention can be manufactured by coupling a diazo compound of the formula Ia or Ib

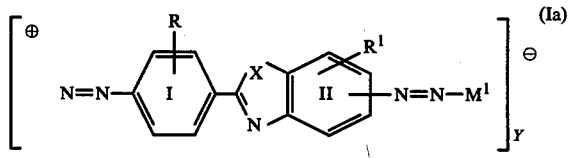
(Ia)

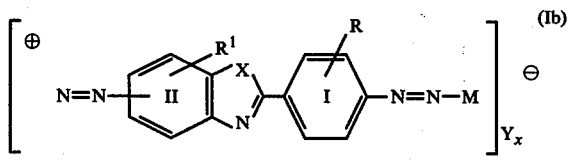
(Ib)

wherein $Y^\ominus$ is the anion of a strong acid, in an aqueous medium at temperatures between $-10°$ and $+30°$ C., at a pH value between 6 and 12, with a monoazo dye of the formula II

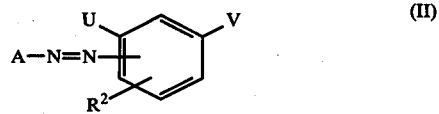
(II)

wherein at least one of the substituents is a sulfo or carboxyl group. The coupling medium can also contain organic solvents, for example alcohols, such as methanol or ethanol, and coupling accelerators, such as, for example, pyridine, urea or thiourea, at temperatures preferably from 0°–20° C., and in a preferred pH range of 8–10.

The diazotized monoazo dyes of furmula Ia and Ib can be manufactured by tetrazotizing a heterocyclic diamine of the general formula III

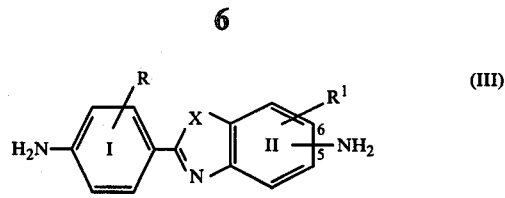
(III)

and coupling the tetrazotized product on one side with a coupling component of the formula IV

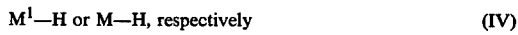
(IV)

in which M and M' are as first defined to above.

The monoazo dye of formula II can be manufactured by diazotising a diazo component of the formula V $$A - NH_2 \quad (V)$$

wherein A has the above-mentioned meaning and coupling the diazotized produce, in a 1:1 molar ratio, with a coupling component of the formula VI

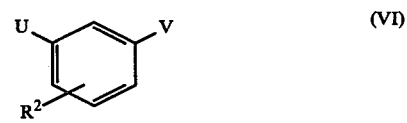
(VI)

The amines III or V are for example treated with nitrous acid or compounds which split off nitrous acid, such as nitrites or nitrosylsulfuric acid, at temperatures between $-10°$ and $+30°$ C. in an aqueous medium at pH values below 2, or in the presence of aliphatic carboxylic acids such as formic acid, acetic acid and propionic acid or mixtures thereof, preferably in the presence of mineral acids or in concentrated sulfuric acid. They are then also coupled at temperatures from $-10°$ to $+30°$ C., preferably at 0°–20° C., in an aqueous medium which can contain organic solvents. The coupling of the diazotized diazo component V with the coupling component VI can be carried out at pH values between 3 and 12.

The coupling of the tetrazotized heterocyclic diamine (III) on one side with the coupling component IV is preferably carried out at a pH 7 to 10.

A further process for the manufacture of the water-soluble trisazo dyes of the present invention is afforded by coupling a diazotized disazo dye of the formula VIIa or VIIb

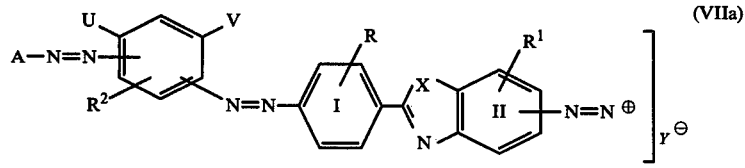
(VIIa)

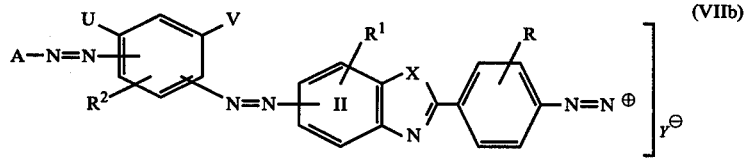
(VIIb)

with a coupling component of the formula IV

(IV)

This coupling can also be effected in an aqueous medium which can contain organic solvents, for example alcohols, such as methanol or ethanol, at temperatures from −10° C. to +30° C., preferably 0° to 20° C., within a pH range of 3 to 11, preferably 4 to 9.

The diazotized disazo dyes VIIa and VIIb can be manufactured by tetrazotizing the diamine III

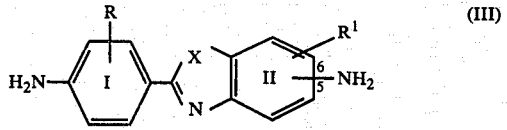 (III)

and coupling the tetrazotized product on one side with a monoazo dye II

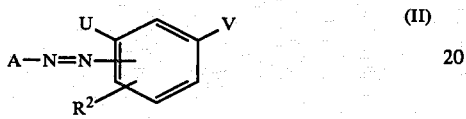 (II)

This coupling is likewise carried out in an aqueous medium which can contain organic solvents, at temperatures from −10° C. to +3−° C., preferably 0° to 20° C., and within a weakly acid or alkaline pH range, preferably at pH values of 4 to 10, with or without coupling accelerators.

In both of the above-mentioned one-sided coupling reactions, the reactants are preferably combined in a 1:1 molar ratio.

The dyes of the present invention can also be manufactured by diazotizing amine V $$A - NH_2 \quad (V)$$

and coupling the resulting diazo compound with a disazo dye of the general formula VIIIa or VIIIb

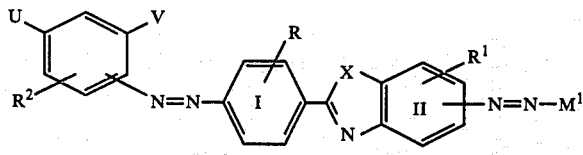 (VIIIa)

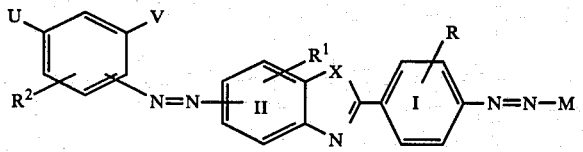 (VIIIb)

in an aqueous medium which can optionally contain organic solvents or coupling accelerators which are in themselves known, for example urea, at temperatures from −10° to +30° C., preferably at 0°-20° C., and at a pH value normally 4 to 12. The disazo dye VIIIa and VIIIb can be manufactured by tetrazotizing the heterocyclic diamine III and coupling the tetrazotized product on one side at a pH of 4 to 12 with coupling component $M^1$ — H or M — H to give the diazotized monoazo dye, and this diazotized monoazo dye is then coupled with coupling component VI

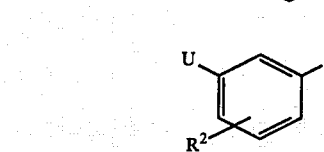 (VI)

at pH values of 4 to 12.

Copper-containing trisazo dyes according to the present invention can be manufactured by coupling the diazo compounds Ia or Ib in an aqueous medium at temperatures between −10° and +30° C. at a pH value between 6 and 12 with an azo dye of the general formula IX

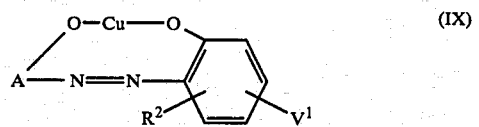 (IX)

wherein at least one of the substituents is a sulfo or carboxyl group.

The copper-containing monoazo dyes IX are obtained by coupling a diazotized diazo component of the formula XI

 (XI)

in which $R^{15}$ is in an adjacent position to the amino group and denotes OH, —O-alkyl having 1 to 4 C atoms, chlorine or hydrogen, with a coupling component which has the formula XII

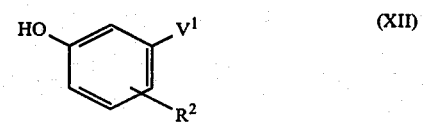 (XII)

wherein hydroxyl is preferred for $V^1$, and by subsequently coppering in a direct manner, by dealkylation, by dehalogenation or by oxidation.

The direct coppering process is carried out when $R^{15}$ is a hydroxyl group. If $R^{15}$ is an alkoxy group, coppering is carried out by dealkylation, if $R^{15}$ is halogen, coppering is carried out by dehalogenation and, if $R^{15}$ is hydrogen, coppering is carried out by oxidation.

The coppering processes are described, for example, in Houben-Weyl, Methoden der organischen Chemie, volume X/3 (1965), pages 450–461.

The direct coppering process is carried out either after or during the coupling reaction. When the coppering process is carried out after the coupling reaction, the monoazo compound of the general formula XIII

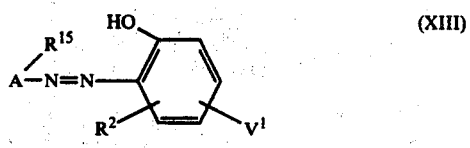

formed by the coupling is reacted in a weakly acid or weakly basic, preferably ammoniacal, reaction medium with copper-II salts, especially with copper-II tetraamine sulfate, at temperatures between +10° and +60° C. Lower temperature can also be used but are not desirable because of lowered solubility. Increasing the temperature above 60° C. is generally not necessary, since at this temperature the monoazo compounds XIII are generally adequately soluble, If the coppering is carried out in a weakly acid medium, for example at pH values between 3 and 7, using copper-II salts, such as, for example, copper-II sulfate, the mineral acid liberated during the coppering process, for example sulfuric acid, is preferably taken up by a buffer substance, for example sodium acetate.

In the case of coppering during coupling, the copper compound is added to the solution of the coupling component and the diazonium salt solution is added dropwise to this mixture. In other respects the same conditions apply to this method of carrying out the reaction as are described above for coppering after coupling.

Coppering with dealkylation, that is to say the coppering of monoazo compounds XIII in which $R^{15}$ is an alkoxy group, can be carried out by heating the monoazo compound for a prolonged period with copper donors in a weakly acid or ammoniacal reaction medium or by the so-called baking process, that is to say by heating the monoazo compound for several hours with copper-II acetate or with a mixture of copper-II sulfate and sodium acetate at about 120°–130° C. Coppering in an ammoniacal medium generally requires heating at 80°–90° C. for 6 to 12 hours. The reaction time can be shortened by carrying out the reaction at elevated temperature or under pressure. The ammonia can be wholly or partly replaced by pyridine or other organic nitrogen-containing bases.

Coppering with dealkylation in a weakly acid medium at pH values between 4 and 6 is carried out by heating solutions or suspensions of the monoazo compound XIII with copper-II sulfate/sodium acetate at about 80°–90° C. Here also the reaction time is variable within wide limits and depends on the reactivity of the monoazo compound. In general, reaction times of 4 to 8 hours are adequate.

Coppering with dehalogenation, that is to say the coppering of monoazo compounds XIII in which $R^{15}$ denotes halogen, takes place when the monoazo compounds are warmed with solutions of copper complex compounds in alkaline, preferably aqueous, reaction media. Examples of suitable copper complex compounds are copper-II tetraamine salts, copper tartrate complexes or pyridine complexes. This coppering is carried out by heating at about 80° C. for several hours. Here also the reaction time depends on the reactivity of the monoazo compound XIII.

The oxidative coppering of monoazo compounds XIII in which $R^{15}$ denotes hydrogen can be carried out by reacting the monoazo compound with copper-II salts in the presence of oxidizing agents at temperatures of, preferably, between 40° and 70° C. and pH values between 4.5 and 7. The mineral acid which is liberated when using copper salts of the mineral acids is neutralized during the reaction or is approximately taken up by adding an appropriate quantity of a buffer substance, for example sodium acetate. Oxidizing agents which can be used are hydrogen peroxide or other peroxide compounds, for example sodium persulfate or sodium perborate. Oxygen or air are also effective as oxidizing agents if the reaction is carried out in the presence of copper powder or if substances such as benzaldehyde-phenylhydrazone-4-sulfonic acid or anthraquinone-2-sulfonic acid, which form peroxides with air are added.

The copper-containing dyes of the present invention can also be manufactured by combining copper-containing, diazotized disazo dyestuffs of the formula XIVa or XIVb

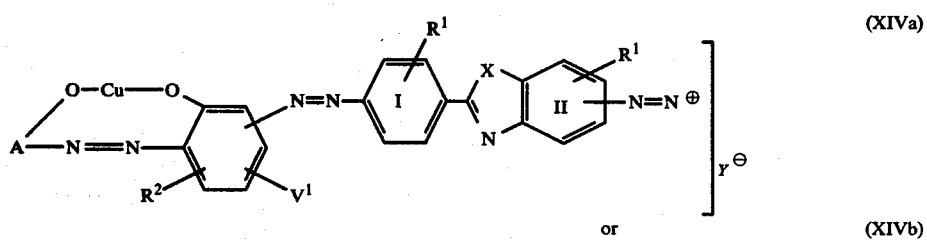

or

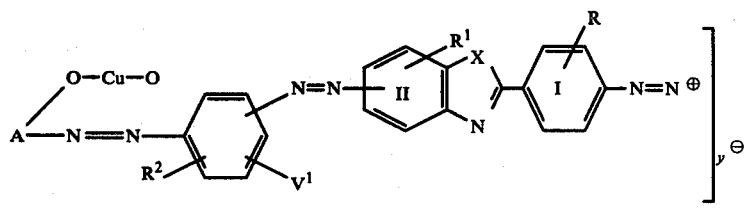

with a coupling component $M^1 — H$ or $M — H$ in an aqueous medium which can also contain organic solvents, for example alcohols, such as methanol or ethanol, at temperatures from −10° C. to +30° C., preferably 0° to 20° C., within a pH range of 3 to 11, preferably 4 to 9. The copper-containing, diazotized disazo dyes XIVa and XIVb can be manufactured by coupling the tetrazotized heterocyclic diamine III on one side with monoazo dyes IX.

This one-sided coupling is carried out in an aqueous medium which can also contain organic solvents, at temperatures from 0° to 20° C. and in a weakly acid or alkaline pH range, preferably within a pH range of 4 to 10, preferably with the two reactants combined in a 1:1 molar ratio, and with or without coupling accelerators.

It is also possible to manufacture the copper-containing trisazo dyestuffs of the present invention by coppering with copper-II salts in a direct manner, with dehalogenation, with dealkylation, or with oxidation, all as explained above, dyes of the formula XVa or XVb thiazole and 2-(4'-aminophenyl)-5-chloro-6-amino-benzthiazole.

Tautomerism is possible in the case of the benzimidazoles (where X = —NH—), so that, for example, one cannot distinguish between the 5-position and the 6-position. If further substituents are present in the fused benzene ring, two different possibilities of numbering arise and this has been taken into account in the preceding list.

Insofar as the heterocyclic diamines III have not already been described in the literature, they can be manufactured by various processes. Benzimidazoles

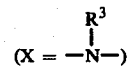

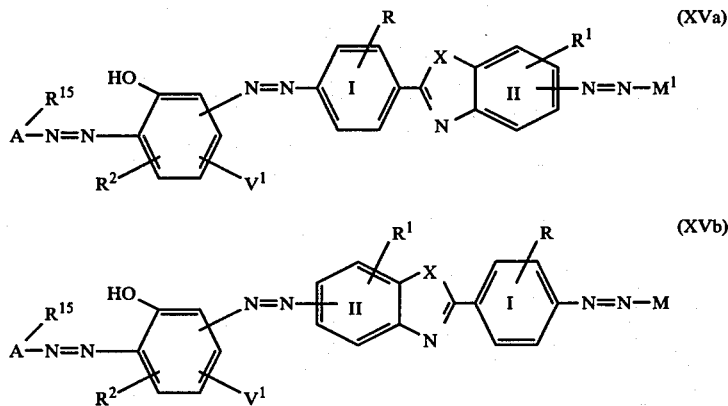

wherein the dyes contain at last one sulfo or carboxyl group.

Examples of suitable diamines of the formula III are: 2-(4'-aminophenyl)-5- (or 6)-amino-benzimidazole, 1-methyl-2-(4'-aminophenyl)-6-amino-benzimidazole, 1-methyl-2-(4'-aminophenyl)-5-amino-benzimidazole, 1-ethyl-2-(4'-aminophenyl)-5-amino-benzimidazole, 1-propyl-2-(4'-aminophenyl)-5-amino-benzimidazole, 1-butyl-2-(4'-aminophenyl)-5-amino-benzimidazole, 1-phenyl-2-(4'-aminophenyl)-5-amino-benzimidazole, 1-benzyl-2-(4'-aminophenyl)-5-amino-benzimidazole, 2-(4'-aminophenyl)-4-methyl-5-amino-benzimidazole (identical with 2-(4'-aminophenyl)-6-amino-7-methyl-benzimidazole), 2-(4'-aminophenyl)-5-amino-6-methyl-benzimidazole (identical with 2-(4'-aminophenyl)-5-methyl-6-amino-benzimidazole), 2-(4'-aminophenyl)-5-amino-6-chloro-benzimidazole (identical with 2-(4'-amino-phenyl)-5-chloro-6-amino-benzimidazole), 2-(4'-aminophenyl)-5-amino-7-chloro-benzimidazole (identical with 2-(4'-aminophenyl)-4-chloro-6-amino-benzimidazole), 2-(4'-aminophenyl)-5-amino-6-ethoxy-benzimidazole (identical with 2-(4'-aminophenyl)-5-ethoxy-6-amino-benzimidazole), 2-(2'-methyl-4'-aminophenyl)-5- (or 6)-amino-benzimidazole, 2-(3'-methyl-4'-aminophenyl)-5- (or 6)-amino-benzimidazole, 2-(2'-chloro-4'-aminophenyl)-5- (or 6)-amino-benzimidazole, 2-(3'-chloro-4'-aminophenyl)-5- (or 6)-amino-benzimidazole, 2-(4'-aminophenyl)-5-amino-benzoxazole, 2-(4'-aminophenyl)-6-aminobenzoxazole, 2-(4'-amino-2'-chlorophenyl)-5-amino-benzoxazole, 2-(4'-aminophenyl)-4-methyl-5-amino-benzoxazole, 2-(4'-aminophenyl)-5-amino-benzthiazole, 2-(4'-aminophenyl)-6-aminobenzthiazole, 2-(4'-aminophenyl)-6-methyl-5-amino-benzthiazole, 2-(4'-aminophenyl)-5-methyl-6-amino-benzand benzoxazoles (X = —O—) can, for example, be manufactured as follows:

Starting with suitably substituted p-nitrobenzoic acids of the formula XVI, the intermediate products (X' denotes

or —O—) XVIII (anilides or phenyl esters of p-nitrobenzoic acid) are manufactured by reaction with suitable substituted anilines or phenols of the formula XVII.

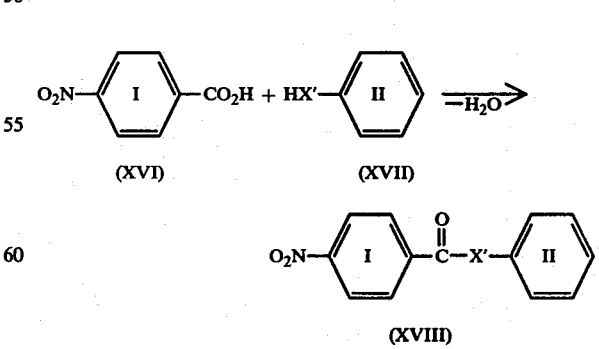

The anilides or phenyl esters of p-nitrobenzoic acid, of the formula XVIII, which can be substituted in the nuclei I and II, are nitrated and the trinitro compounds of the formula XIX are obtained:

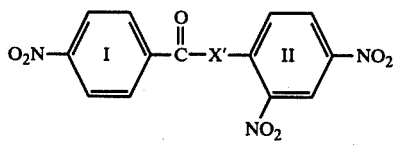

The desired diamines III are produced by subsequent reduction of the three nitro groups and a cyclizing condensation. This sequence of reactions is described in German Patent 70,862; and O. Kym: Ber. dtsch. chem. Ges. 32, 1,427 to 1,432 (1899) and 32, 2,178 to 2,180 (1899).

Examples of suitable nitrobenzoic acids XVI are: 4-nitrobenzoic acid, 2-chloro-4-nitrobenzoic acid, 3-chloro-4-nitrobenzoic acid, 2-bromo-4-nitrobenzoic acid, 3-bromo-4-nitrobenzoic acid, 2-methyl-4-nitrobenzoic acid and 3-methyl-4-nitrobenzoic acid.

By employing substituted 4-nitrobenzoic acid derivatives it is possible to manufacture diamines III which are correspondingly substituted in ring I.

Besides the compounds which are unsubstituted in the nucleus, starting compounds XVII include those which are substituted in the 2-, 3- and 5-positions of the benzene ring, for example: aniline, 2-methylaniline, 3-methylaniline, 2-methoxyaniline, 2-methyl-5-methoxyaniline, 2,5-dimethoxyaniline, 2-chloroaniline, 3-chloroaniline, 5-chloro-2-methylaniline, N-methylaniline, N-ethylaniline, N-propylaniline, N-butylaniline, N-benzyl-2-chloroaniline, phenol, 2-methyl-phenol, 3-methoxyphenol and 3-chloro-phenol. In this way it is possible to introduce substituents into the 4-, 6- or 7-positions of ring II of the heterocyclic diamines III.

It is also possible to react suitably substituted p-nitrobenzoic acid chlorides of the formula XX with 2,4- or 2,5-dinitroaniline, 2,4- or 2,5-dinitrophenol or 2,4- or 2,5-dinitrothiophenol, of the formula XXI, which can optionally contain yet further substituents in the nucleus II, to give the trinitro compounds XXII.

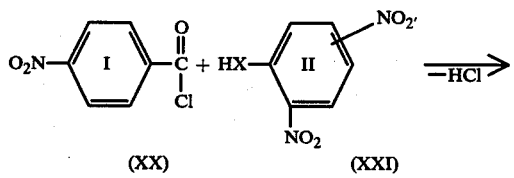

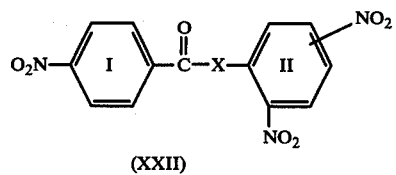

and to convert the trinitro compounds XXII into the heterocyclic diamines of the formula III by reduction and a cyclizing condensation reaction. This manufacturing process is described in O. Kym; Ber. dtsch. chem. Ges. 32, 1,427 to 1,432 (1899) and Chem. Abstr. 52, 17,240 (1958) (B. A. Porai-Koshits and Ch. Frankowskii, Zhur. Obshchei Khim. 28, 928 (1958)).

The following, for example, can be employed as the nitrobenzoic acid chloride XX: 4-nitrobenzoic acid chloride, 2-chloro-4-nitrobenzoic acid chloride, 3-chloro-4-nitrobenzoic acid chloride, 2-bromo-4-nitrobenzoic acid chloride, 3-bromo-4-nitrobenzoic acid chloride, 2-methyl-4-nitrobenzoic acid chloride and 3-methyl-4-nitrobenzoic acid chloride.

The following examples can be used as the dinitro compounds of the general formula XXI: 2,4-dinitroaniline, N-methyl-2,4-dinitroaniline, N-phenyl-2,4-dinitroaniline, 5-chloro-2,4-dinitroaniline, 5-bromo-2,4-dinitroaniline, N-phenyl-5-chloro-2,4-dinitroaniline, 6-chloro-2,4-dinitroaniline, 5,6-dichloro-2,4-dinitroaniline, 2,5-dinitroaniline, N-methyl-2,5-dinitroaniline, N-propyl-2,5-dinitroaniline, 4-chloro-2,5-dinitroaniline, 4-bromo-2,5-dinitroaniline, 6-chloro-2,5-dinitroaniline, N-phenyl-4-bromo-2,5-dinitroaniline, 2,4-dinitrophenol, 3-chloro-2,4-dinitrophenol, 5-chloro-2,4-dinitrophenol, 6-chloro-2,4-dinitrophenol, 2,5-dinitrophenol, 4-chloro-2,5-dinitrophenol, 4,6-dinitro-3-hydroxy-toluene, 2,5-dinitro-4-hydroxy-toluene and 2,4-dinitrothiophenol.

The heterocyclic diamines III can also be obtained by reacting suitably substituted derivatives of p-aminobenzoic acid XXIII with suitably substituted 2,4-diamino derivatives of the aniline, phenol or thiophenol XXIV in the presence of polyphosphoric acid:

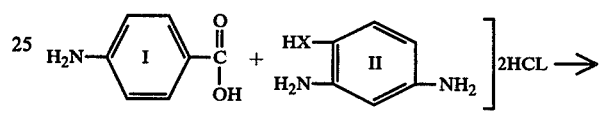

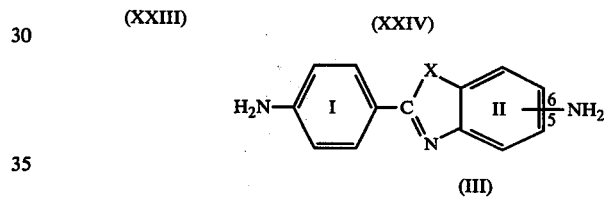

Such a reaction is discussed in J. Preston, W. DeWinter and W. L. Hofferberth Jr., J. Heterocycl. Chem. 1969, 6 (1), 119, and M. T. Bogert and M. G. Sevag, J. Am. Chem. Soc. 53, 660 (1931); F. F. Stephens and D. G. Wibberley, J. Chem. Soc. 1950, 3336; and M. T. Bogert and W. S. Taylor, Collection Czechoslov. Chem. Comm 3, 480 (1931).

The heterocyclic diamines III can also be manufactured by a further process in which a suitably substituted p-nitrobenzoic acid chloride XX is reacted with suitably substituted 4- or 5-nitro derivatives of o-phenylenediamine, o-aminophenol or o-aminothiophenol of the formula XXV:

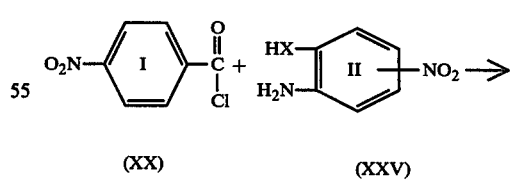

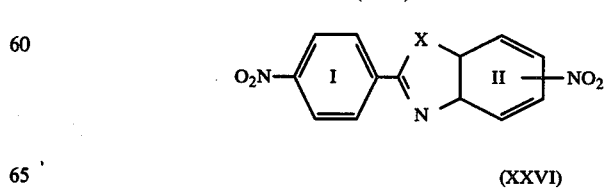

The heterocyclic dinitro compounds XXVI which are thus obtained are then reduced to give the heterocyclic diamino compounds III, as described in Muttelet, Annales de Chimie et Physique [7] 14, 415; B. N. Feitelson, P. Mamalis, R. J. Monalim, V. Petrow, O. Stephenson and B. Sturgeon, J. Chem. Soc. 1952, 2,389; Chem. Abstr. 67, 91,987 b (1967), see also H. Hauser, Helv. Chim. Acta 11, 198 (1928) and French Patent 854,156.

The following are suitable 4- or 5-nitro compounds of formula XXV: 4-nitro-1,2-diaminobenzene, $N^1$-phenyl-4-nitro-1,2-diaminobenzene, 4-nitro-2-amino-phenol, 5-nitro-2-amino-phenol, 6-chloro-4-nitro-2-aminophenol, 4-nitro-2-amino-thiophenol and 5-nitro-2-amino-thiophenol.

The compounds of formula XX which have been listed above are also representative of those suitable for this manufacturing process.

The heterocyclic diamines III have an unsymmetrical structure. When tetrazotized and coupled with a coupling component M—H or $M^1$-H, two possibilities can arise, depending on which side of the tetrazotized diamine becomes attached. Corresponding to these two possibilities for the intermediates, the following two structures are given for the final dyes:

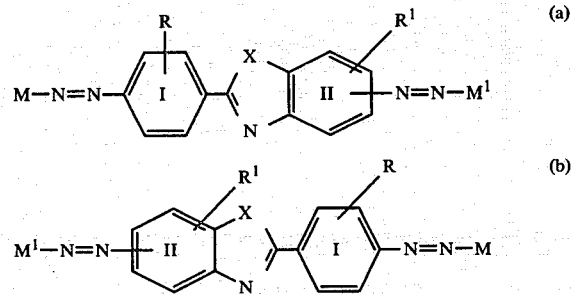

The trisazo dyes prepared by this method are mixtures of the two structures (a) and (b). Where M is the monoazo coupling component II, IX or XIII, structure (b) predominates in the mixture.

The following are examples of diazo components A—NH$_2$ of the formula V which are suitable for the manufacture of the metal-free dyes of the present invention: aniline, 2-, 3- and 4-chloro aniline, 2-, 3- and 4-methylaniline, 2-, 3- and 4-ethylaniline, 2-, 3- and 4-propylaniline, 2-, 3- and 4-butylaniline, 4-isopropylaniline, 2,4- and 2,5-dimethylaniline, 2-, 3- and 4-methoxyaniline, 2-, 3- and 4-ethoxyaniline, 2-, 3- and 4-propoxyaniline, 2-, 3- and 4-butoxyaniline, 2-methyl-5-methoxyaniline, 4-chloro-2-methylaniline, 5-chloro-2-methylaniline, 2,3-, 2,4- and 2,5-dichloroaniline, 2-, 3- and 4-nitroaniline, 2-chloro-4-nitroaniline, 2-methyl-5-nitroaniline, 2-nitro-4-methylaniline, 4-cyanoaniline, 4-nitro-2-cyano-aniline, 4-carboethoxyaniline, 4-aminobenzoic acid, 3- (or 5)-aminosalicyclic acid, 4-aminobenzoic acid amide, 4-aminobenzenecaboxylic acid methylamide, 4-aminobenzenecaboxylic acid dimethylamide, 3-amino-4-methoxy-benzoic acid amide, 3-amino-4-methoxybenzoic acid butylamide, 4-aminobenzanilide, 3-amino-4-methoxybenzanilide, 2-, 3- and 4-aminobenzenesulphonic acid, 4-aminobenzenesulphonic acid amide, 3-aminobenzenesulphonic acid amide, 4-aminobenzenesulphonic acid methylamide, 4-aminobenzenesulphonic acid dimethylamide, 4-aminobenzenesulphonic acid diethylamide, 4-aminobenzenesulphonic acid monobutylamide, 1-amino-3-acetylaminobenzene, 1-amino-4-acetylaminobenzene, 1-amino-4-propionylaminobenzene, 1-amino-4-butyrylaminobenzene, 1-amino-4-benzoylaminobenzene, 4-aminobenzene-1,3-disulphonic acid, 2-aminobenzene-1,4-disulphonic acid, 2-amino-5-nitro-benzenesulphonic acid, 4-nitro-4'-amino-diphenylamine-2-sulphonic acid, 3-amino-4-methylbenzenesulphonic acid, 3-methyl-4-aminobenzenesulphonic acid, 1-aminonaphthalene, 1-aminonaphthalene-4-sulphonic acid, 1-aminonaphthalene-5-sulphonic acid, 1-aminonaphthalene-6- or 7-sulphonic acid, 1-aminonaphthalene-3,6-disulphonic acid, 1-aminonaphthalene-5,7-disulphonic acid, 1-aminonaphthalene-3,7-disulphonic acid,2-aminonaphthalene-5-sulphonic acid, 2-aminonaphthalene-6-sulphonic acid, 2-aminonaphthalene-7-sulphonic acid, 2-aminonaphthalene-8-sulphonic acid, 2-aminonaphthalene-3,6-disulphonic acid, 2-aminonaphthalene-4,8-disulphonic acid, 2-aminonaphthalene-6,8-disulphonic acid, 2-aminonaphthalene-5,7-disulphonic acid, 2-amino-8-hydroxynaphthalene-6-sulphonic acid, 2-amino-5-hydroxynaphthalene-7-sulphonic acid, 1-amino-8-hydroxynaphthalene-3,6-disulphonic acid, 2-amino-8-hydroxynaphthalene-3,6-disulphonic acid, 2-aminonaphthalene-3,6,8-trisulphonic acid, 2,4,5-trichloroaniline, 2-aminobenzthiazole, 6-methyl-2-aminobenzthiazole, 6-ethyl-2-aminobenzthiazole, 6-methoxy-2-aminobenzthiazole, 6-ethoxy-2-aminobenzthiazole, 6-chloro-2-aminobenzthiazole, 6-nitro-2-aminobenzthiazole, 6-sulpho-2-aminobenzthiazole, dehydrothiotoluidine, dehydrothiotoluidine sulphonic acid and dehydrothiotoluidine disulphonic acid.

The following are examples of diazo components of the formula

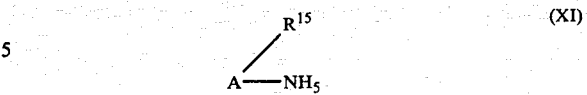

which are suitable for the manufacture of the copper-containing dyes of the present invention: 2-, 3- and 4-aminobenzenesulphonic acid, 1-aminonaphthalene-4-sulphonic acid, 1-aminonaphthalene-5-sulphonic acid, 1-aminonaphthalene-6- and 7-sulphonic acid, 2-amino-1-hydroxybenzene, 2-amino-1-ethoxybenzene, 4-chloro-2-aminophenol, 4-chloro-2-aminoanisole, 1-amino-2-methoxynaphthalene, 1-amino-2-methoxy (or -ethoxy)-naphthalene-6- (or 7-) sulphonic acid, 1-amino-2-hydroxynaphthalene-4-sulphonic acid, 2-amino-3-hydroxynaphthalene-6-sulphonic acid, 2-aminophenol-4-sulphonic acid, 2-aminophenol-4-sulphonic acid amide, 2-aminoanisole-4-sulphonic acid, 2-aminoanisole-4-sulphonic acid amide, 2-aminoanisole-4-sulphonic acid methylamide, 2-aminoanisole-4-sulphonic acid dimethylamide, 2-aminoanisole-4-sulphonic acid diethylamide, 6-chloro-2-aminophenol-4-sulphonic acid, 6-nitro-2-aminophenol-4-sulphonic acid, 4-chloro-2-aminophenol-6-sulphonic acid, 2-aminophenol-4,6-disulphonic acid, 3-amino-2-hydroxy-5-sulphobenzoic acid, 2-chloro-1-aminobenzene-5-sulphonic acid and 3-chloro-2-aminotoluene-5-sulphonic acid.

Examples of coupling components of the general formula VI which are suitable for the manufacture of the metal-free dyes of the present invention are: 1,3-diaminobenzene, 1,3-diamino-4-methylbenzene, 1,3-diamino-4-ethylbenzene, 1,3-diamino-4-n-propylbenzene, 1,3-diamino-4-butylbenzene, 1,3-diamino-4-chlorobenzene, 1,3-diamino-4-bromobenzene, 1,3-diamino-4-nitrobenzene, 1,3-diamino-4-methoxybenzene, 1,3-diamino-4-ethoxybenzene, 1,3-diamino-4-n-propoxybenzene, 1,3-diamino-4-isopropoxybenzene, 1,3-diaminobenzene-4-sulphonic acid, 1-amino-3-dimethylaminobenzene, 1-amino-3-carboxymethylaminobenzene, 1-amino-3-carboxyethylaminobenzene, 1-amino-3-sulphomethylaminobenzene, 1-amino-3-sulphoethylaminobenzene, 1-amino-3-hydroxyethylaminobenzene, 1-amino-3-hydroxybenzene, 1-amino-3-hydroxy-4-chlorobenzene, 1-phenylamino-3-hydroxybenzene, 1-(2'-methylphenylamino)-3-hydroxybenzene, 3-aminophenol-4-sulphonic acid, 3-aminophenol-6-sulphonic acid, 1,3-dihydroxybenzene, 1,3-dihydroxy-2-chlorobenzene, 1,3-dihydroxy-4-chlorobenzene, 1,3-dihydroxy-5-methylbenzene, 1,3-dihydroxy-4-hexylbenzene, 1,3-dihydroxybenzene-4-sulphonic acid and 1,3-dihydroxybenzene-5-sulphonic acid.

Examples of coupling components, of the general formula XII, which are suitable for the manufacture of the copper-containing dyes of the present invention are:

1,3-dihydroxybenzene, 1,3-dihydroxy-2-chlorobenzene, 1,3-dihydroxy-4-chlorobenzene, 1,3-dihydroxy-5-methylbenzene, 1,3-dihydroxy-4-hexylbenzene, 1,3-dihydroxybenzene-4-sulphonic acid, 1,3-dihydroxybenzene-5-sulphonic acid, 1-amino-3-hydroxybenzene, 1-amino-3-hydroxy-4-chlorobenzene, 1-(2'methyl-phenylamino)-3-hydroxybenzene, 1-phenylamino-3-hydroxybenzene, 3-aminophenol-4-sulphonic acid and 3-aminophenol-6-sulphonic acid.

Examples of coupling components M—H or $M^1$—H which are suitable for the manufacture of the dye-stuffs according to the invention are: phenol, 2-methylphenol, 4-methylphenol, 3-chlorophenol, 3-methoxyphenol, 1,3-dihydroxybenzene, 1,3-dihydroxy-4-chlorobenzene, 1,3-dihydroxy-2-chlorobenzene, 1,3-dihydroxy-5-methylbenzene, 1-amino-3-hydroxybenzene, 1-amino-3-hydroxy-4-chlorobenzene, 1-(2'-methyl-phenylamino)-3-hydroxy-benzene, 1,3-diaminobenzene, 1,3-diamino-4-methyl-benzene, 1,3-diamino-4-ethylbenzene, 1,3-diamino-4-chloro-benzene, 1,3-diamino-4-ethoxybenzene, 1,3-diamino-4-nitro-benzene, 1-amino-3-dimethylamino-benzene, 1-acetylamino-3-diethylamino-benzene, 1-amino-3-carboxymethylamino-benzene, 1-amino-3-carboxyethylamino-benzene, 1-amino-3-sulphomethylamino-benzene, 1-amino-3-hydroxyethylaminobenzene, 1-amino-3-sulphoethylamino-benzene, 1,3-diaminobenzene-4-sulphonic acid, 2-hydroxybenzoic acid, 5-chloro-2-hydroxybenzoic acid, 2-hydroxy-3-methyl-benzoic acid, 2-hydroxy-4-methylbenzoic acid, 2-hydroxy-5-sulpho-benzoic acid, 2-hydroxybenzoic acid ethyl ester, 2-hydroxybenzenesulphonic acid, 1-hydroxynaphthalene, 1,6-dihydroxynaphthalene, 1-hydroxynaphthalene-3-sulphonic acid, 1-hydroxynaphthalene-4-sulphonic acid, 1-hydroxynaphthalene-3,6-disulphonic acid, 1-hydroxynaphthalene-5-, -6- and -7-sulphonic acid, 2-hydroxynaphthalene, 2-hydroxynaphthalene-3-carboxylic acid, 2-hydroxynaphthalene-6-, -7- and -8-sulphonic acid, 2-hydroxynaphthalene-3,6-disulphonic acid, 2-hydroxynaphthalene-6,8-disulphonic acid, 1-aminonaphthalene-4-, -5-, -6- and -7-sulphonic acid, 1-aminonaphthalene-3,6-disulphonic acid, 2-aminonaphthalene-3,6-disulphonic acid, 2-aminonaphthalene-4,8-disulphonic acid, 1-amino-7-hydroxynaphthalene, 2-amino-7-hydroxynaphthalene, 1-amino-5-hydroxynaphthalene-7-sulphonic acid, 1-amino-7-hydroxynaphthalene-5-sulphonic acid, 1-amino-8-hydroxynaphthalene-4-sulphonic acid, 1-amino-8-hydroxynaphthalene-2,4-disulphonic acid, 1-amino-8-hydroxynaphthalene-3,6-disulphonic acid, 1-amino-8-hydroxynaphthalene-4,6-disulphonic acid, 2-amino-5-hydroxynaphthalene-7-sulphonic acid, 2-amino-8-hydroxynaphthalene-6-sulphonic acid, 2-amino-8-hydroxynaphthalene-3,6-disulphonic acid, acetoacetic acid anilide, acetoacetic acid toluidide, acetoacetic acid 2-sulphoanilide, acetoacetic acid 3-sulphoanilide, acetoacetic acid 4-sulphoanilide, acetoacetic acid 4-carboxyanilide, acetoacetic acid 2-methoxyanilide, acetoacetic acid 4-methoxyanilide, acetoacetic acid 2-methyl-4-chloroanilide, acetoacetic acid 2-chloroanilide, acetoacetic acid 4-chloroanilide, acetoacetic acid 2,5-dimethoxy-4-chloroanilide, 3-methyl-5-pyrazolone, 1-phenyl-3-methyl-5-pyrazolone, 1-[2'-sulphophenyl]-3-methyl-5-pyrazolone, 1-[3'-sulphophenyl]-3-methyl-5-pyrazolone, 1-[4'-sulphophenyl]-3-methyl-5-pyrazolone, 1-phenyl-5-pyrazolone-3-carboxylic acid, 1-[4'-sulphophenyl]-5-pyrazolone-3-carboxylic acid, 1-(3'-nitrophenyl)-3-methyl-5-pyrazolone, 1-(4'-methyl-phenyl)-3-methyl-5-pyrazolone, 1-(4'-methyl-phenyl)-3-butoxycarbonyl-5-pyrazolone, 1-(3'-sulpho-phenyl)-3-alkoxycarbonyl-5-pyrazolone, 1-(6'-chloro-3'-sulpho-phenyl)-3-methyl-5-pyrazolone, 1-(2'-chloro-4'-sulpho-phenyl)-3-methyl-5-pyrazolone, 1-(4'-sulpho-2'-methylphenyl)-3-methyl-5-pyrazolone, 5-cyano-6-hydroxy-2-pyridone, 4-methyl-3-cyano-6-hydroxy-2-pyridone, 4-methyl-3-carboy-6-hydroxy-2-pyridone, 4-methyl-6-hydroxy-2-pyridone-3-carboxylic acid amide, 1,4-dimethyl-3-cyano-6-hydroxy-2-pyridone, 1-n-butyl-3-cyano-4-methyl-6-hydroxy-2-pyridone, 1-(2-ethylhexyl)3-cyano-4-methyl-6-hydroxy-2-pyridone, 1-ethyl-3 cyano-4-butyl-6-hydroxy-2-pyridone, 1-ethyl-3-carboxy-4 methyl-6-hydroxy-2-pyridone, 1-ethyl-3-sulpho-4-methyl-6-hydroxy-2-pyridone, 1,4-dimethyl-3-sulpho-6-hydroxy-2-pyridone, 4-methyl-3-sulpho-6-hydroxy-2-pyridone, 1-isopropyl-3-amidocarbonyl-4-methyl-6-hydroxy-2-pyridone and 2,4-dihydroxyquinoline.

The copper-free and copper-containing trisazo dyes of the present invention not only exhibit a high tinctorial strength which is up to 100% superior to that of related prior art dyestuffs, but they are outstandingly suitable as direct dyestuffs for dyeing and printing natural or synthetic fiber materials which contain hydroxyl groups or nitrogen, in particular cotton and regenerated cellulose, as well as wool, silk, polyamide, leather and paper. Dyeing and printing with these dyes can be carried out by the customary processes. Orange, brown and blue dyeings of good fastness properties are obtained on the substrates mentioned. The substrates so dyed are especially distinguished by good fastness to wet processing, for example fastness to water, both from washing at 40° C. and washing at 60° C., and by good fastness to perspiration (alkaline and acid) and fastness to acids and in this respect are significantly better than dyeing of related prior art dyestuffs. The copper-containing trisazo dyestuffs additionally exhibit outstanding fastness to light.

If $X = -NR^3-$, in particular -NH-, the new dyestuffs are absorbed particularly extensively by the fibers to be dyed when dyeing by the exhaustion process, so that a nearly clear residual liquor is obtained. The new dyestuffs are particularly suitable for dyeing clothing linings composed of cotton or regenerated cellulose, and for dyeing polyamide.

In the Examples which follow, parts denote parts by weight, percentages denote percentages by weight and temperatures are in degrees centigrade.

EXAMPLE 1

(a) 22.4 parts of 2-[4'-aminophenyl]-5 (or 6)-aminobenzimidazole in a mixture of 200 parts of water and 50 parts of 30% aqueous hydrochloric acid are tetrazotized, while adding ice, at 0°–5° C., along with a solution of 13.8 parts of sodium nitrite in 50 parts of water, with stirring. Stirring in then continued for 1 hour at 0°–5° C. and excess nitrous acid is removed with amidosulphonic acid. A solution of 15.6 parts of 2-hydroxybenzoic acid and 40 parts of sodium carbonate in 150 parts of water is now added rapidly to the solution of the tetrazo component thus formed. The one-sided coupling is complete after further stirring for 2–3 hours.

A solution of 2-[4'-sulfophenylazo]-1,3-diamino-4-methylbenzene is then added, having been prepared beforehand as follows:

A solution of 14 parts of 1,3-diamino-4-methylbenzene in 100 parts of water is added at pH 4–5 to a suspension of 4-sulfodiazobenzene, prepared from 19.5 parts of 4-aminobenzenesulphonic acid, 25 parts of 30% strength aqueous hydrochloric acid and 8.3 parts of sodium nitrite in 50 parts of water at 0°–5° C. After the coupling is complete, the solution of the orange monoazo dyestuff thus formed is added to the stirred diazotized monoazo dye reaction mixture formed from the 2-hydroxybenzoic acid and the tetrazo compound, and stirring is then continued for 3–4 hours at pH 9–10.

After adjusting the pH value to 5, the trisazo dyestuff formed is filtered off and dried.

(b) A solution of 0.2 part of sodium carbonate and 4 parts of sodium sulfate decahydrate in 200 parts of water is prepared at 40° C. in a dyeing beaker placed in a bath which can be heated.

0.2 part of the final dye prepared in Example 1 is then dissolved in the solution. A 10 g patch of a cotton twill fabric is kept in a continuous motion in this ready-made dyeing liquor while the temperature is raised to 95° C., and dyeing is continued for 45 minutes at this temperature. The dyed cotton fabric is then withdrawn from the residual liquor which retains only a weak color and the liquor still adhering to it is removed by wringing out. The dyed material is then rinsed with cold water and is dried at 60° C.

An orange-brown dyeing with good fastness properties, especially good fastness to washing and perspiration, is obtained.

EXAMPLE 2

A solution of 12.6 parts of 1,3-dihydroxybenzene in 100 parts of water is added with stirring to the diazotized monoazo dyestuff obtained from the one-sided coupling product produced in Example 1 from the tetrazotized 2-(4'-aminophenyl)-5(or 6)-aminobenzimidazole. Stirring is continued for 2 hours in order to complete the coupling reaction. The suspension of the brown disazo dyestuff thus formed is then added with stirring to a suspension of 4-sulfodiazobenzene prepared beforehand as in Example 1. After stirring for a further 5 hours at pH 8–9 and then adjusting the pH value to 5, the trisazo dye thus formed is filtered off and dried.

On cotton the dye gives a brown-orange dyeing of good fastness properties, especially good fastness to washing and perspiration.

EXAMPLE 3

A solution of 14 parts of 1,3-diamino-4-methylbenzene in 100 parts of water is added at pH 4-5 to a suspension of 4-sulfodiazobenzene, prepared as indicated above. After coupling is complete, 30 parts of sodium carbonate are added to the solution of the orange monoazo dye thus formed. A solution of tetrazotized 2-[4'-aminophenyl]-5 (or 6)-aminobenzimidazole prepared exactly as in Example 1 is then added at 0°–5° C. in the course of 30 minutes, with stirring. Stirring is then continued for 3 hours, following which at pH 9-9-5 a solution of 10.9 parts of 1-amino-3-hydroxybenzene in 150 parts of water is added and the resulting mixture is stirred for approximately 5 hours in order to complete the final coupling reaction.

30 parts of sodium chloride are now dissolved in the reaction mixture and it is adjusted to pH 5 with 30% aqueous hydrochloric acid and filtered. The dye thus filtered off is dried at 70°–80° C., and is suitable for dyeing cellulose fibers to produce brown dyeings of good fastness properties, especially good fastness to washing and perspiration.

The structure of further dyestuffs which can be prepared in accordance with Examples 1 and 2 are given in Tables I and II.

Table I

| | Coupling component | | | |
|---|---|---|---|---|
| Diazo component A—NH$_2$ | R$_2$ (U, V) | X = | Coupling component M$^1$—H | Colour shade on cotton |
| 4. 4-Aminobenzene-sulphonic acid | 1,3-Diaminobenzene | —NH— | 2-Hydroxybenzoic acid | orange-brown |
| 5. 4-aminobenzene-sulphonic acid | 1-amino-3-hydroxy-benzene | —NH— | 2-hydroxybenzoic acid | orange-brown |
| 6. 3-aminobenzene-sulphonic acid | 1,3-dihydroxybenzene | —NH— | 2-hydroxybenzoic acid | brown-orange |
| 7. 3-aminobenzene-sulphonic acid | 1,3-diaminobenzene | —NH— | 2-hydroxybenzoic acid | orange |
| 8. 2-aminobenzene-sulphonic acid | 1,3-diaminobenzene | —NH— | 2-hydroxybenzoic acid | orange |
| 9. 2,4-disulphonic acid | | | | |
| 10. 1-aminonaphthalene-4-sulfonic acid | 1,3-diaminobenzene | —NH— | 2-hydroxybenzoic acid | brown |
| 11. 1-aminonaphthalene-5-sulphonic acid | 1,3-diaminobenzene | —NH— | 2-hydroxybenzoic acid | brown |
| 12. 2-aminonaphthalene-6,8-disulphonic acid | 1,3-diaminobenzene | —NH— | 2-hydroxybenzoic acid | brown |
| 13. 2-amino-8-hydroxy-naphthalene-6 | 1,3-diaminobenzene | —NH— | 2-hydroxybenzoic acid | brown |

Table I-continued

| | Diazo component A—NH₂ | Coupling component V | —X— | Coupling component M¹—H | Colour shade on cotton |
|---|---|---|---|---|---|
| 14. | 2-amino-8-hydroxy-naphthalene-3,6-disulphonic acid | 1,3-diaminobenzene | —NH— | 2-hydroxybenzoic acid | brown |
| 15. | 3-aminobenzenesulphonic acid | 1,3-diamino-4-methylbenzene | —NH— | 2-hydroxybenzoic acid | orange-brown |
| 16. | 2-aminobenzenesulphonic acid | 1,3-diamino-4-methylbenzene | —NH— | 2-hydroxybenzoic acid | orange-brown |
| 17. | 1-aminonaphthalene-4-sulphonic acid | 1,3-diamino-4-methylbenzene | —NH— | 2-hydroxybenzoic acid | brown |
| 18. | 2-aminonaphthalene-6,8-disulphonic acid | 1,3-diamino-4-methylbenzene | —NH— | 2-hydroxybenzoic acid | brown |
| 19. | 4-Aminobenzenesulphonic acid | 1,3-diamino-4-methylbenzene | —NH— | 3-sulpho-4-methyl-6-hydroxy-2-pyridone | brown |
| 20. | 4-aminobenzenesulphonic acid | 1,3-diamino-4-methylbenzene | —NH— | 2-hydroxy-3-methylbenzoic acid | orange-brown |
| 21. | 4-aminobenzenesulphonic acid | 1,3-diaminobenzene | —NH— | 2-hydroxy-3-methylbenzoic acid | orange-brown |
| 22. | 3-aminobenzenesulphonic acid | 1,3-dihydroxybenzene | —NH— | 2-hydroxy-3-methylbenzoic acid | orange-brown |
| 23. | 1-aminonaphthalene-4-sulphonic acid | 1,3-dihydroxybenzene | —NH— | 2-hydroxybenzoic acid | brown |
| 24. | 1-aminonaphthalene-5-sulphonic acid | 1,3-dihydroxybenzene | —NH— | 2-hydroxybenzoic acid | brown |
| 25. | aniline | 1,3-diaminobenzene-4-sulphonic acid | —NH— | 2-hydroxybenzoic acid | orange-brown |
| 26. | 2-aminobenzoic acid | 1,3-diaminobenzene-4-sulphonic acid | —NH— | 2-hydroxybenzoic acid | orange-brown |
| 27. | 4-aminotoluene | 1,3-diaminobenzene-4-sulphonic acid | —NH— | 2-hydroxybenzenesulphonic acid | orange-brown |
| 28. | 1-aminonaphthalene | 1,3-diaminobenzene-4-sulphonic acid | —NH— | 2-hydroxybenzenesulphonic acid | brown |
| 29. | aniline | 1,3-diaminobenzene-4-sulphonic acid | —NH— | 2-hydroxy-3-methylbenzoic acid | orange-brown |
| 30. | 4-aminobenzenesulphonic acid | 1,3-diaminobenzene | —NH— | 1,3-diamino-benzene-4-sulphonic acid | orange-brown |
| 31. | 4-aminobenzenesulphonic acid | 1,3-diaminobenzene | —NH— | 1,3-diamino-4-methylbenzene-5-sulphonic acid | orange-brown |
| 32. | 4-aminobenzenesulphonic acid | 1,3-diaminobenzene | —NH— | 2-amino-8-hydroxy-naphthalene-6-sulphonic acid | brown |
| 33. | N-acetyl-1,4-diaminobenzene | 1,3-diaminobenzene | —NH— | 1-amino-8-hydroxy-naphthalene-3,6-disulphonic acid | brown |
| 34. | 4-aminobenzenesulphonic acid | 1,3-diamino-4-methylbenzene | —NH— | 2-amino-8-hydroxy-naphthalene-6-sulphonic acid | brown |
| 35. | 4-aminobenzenesulphonic acid | 1,3-diamino-4-methylbenzene | —NH— | 1,3-diaminobenzene-4-sulphonic acid | orange-brown |
| 36. | 4-aminobenzenesulphonic acid | 1,3-diamino-4-methylbenzene | —NH— | 1,3-diamino-2-chlorobenzene-4-sulphonic acid | orange-brown |
| 37. | dehydrothio-toluidine-sulphonic acid | 1,3-diamino-4-methylbenzene | —NH— | 2-hydroxybenzoic acid | brown |
| 38. | 4-aminobenzenesulphonic acid | 1-phenylamino-3-hydroxybenzene | —NH— | 2-hydroxybenzoic acid | brown |
| 39. | aniline | 3-aminophenylglycine | —NH— | 2-hydroxybenzoic acid | orange-brown |
| 40. | aniline | 1-amino-3-sulpho-ethylaminobenzene | —NH— | 2-hydroxybenzoic acid | orange-brown |
| 41. | 4-aminobenzenesulphonic acid | 1,3-diaminobenzene | —N(CH₃)— | 2-hydroxybenzoic acid | orange-brown |

| | Diazo component A—NH₂ | Coupling component R₂ | X = | Coupling component M¹—H | Colour shade on cotton |
|---|---|---|---|---|---|
| 42. | 4-aminobenzenesulphonic acid | 1,3-diaminobenzene | —NH—; 4-CH₃ | 2-hydroxybenzoic acid | orange-brown |
| 43. | 4-aminobenzenesulphonic acid | 1,3-diaminobenzene | —NH; 6-Cl | 2-hydroxybenzoic acid | orange-brown |
| 44. | 4-aminobenzenesulphonic acid | 1,3-diaminobenzene | —NH; 2'-CH₃ | 2-hydroxybenzoic acid | orange-brown |
| 45. | 4-aminobenzenesulphonic acid | 1,3-diaminobenzene | —NH—; 3'-Cl | 2-hydroxybenzoic acid | orange-brown |
| 46. | 4-aminobenzenesulphonic acid | 1,3-diaminobenzene | —O— | 2-hydroxybenzoic acid | orange-brown |
| 47. | 4-aminobenzenesulphonic acid | 1,3-diaminobenzene | —S— | 2-hydroxybenzoic acid | orange-brown |
| 48. | 4-aminobenzenesulphonic acid | 1,3-diaminobenzene | —S—; 6-CH₃ | 2-hydroxybenzoic acid | orange-brown |
| 49. | 4-aminobenzenesulphonic acid | 1,3-diamino-4-methylbenzene | —S—; 6-CH₃ | 2-hydroxybenzoic acid | orange-brown |
| 50. | 4-aminobenzenesulphonic acid | 1,3-dihydroxybenzene | —S—; 6-CH₃ | 2-hydroxybenzoic acid | brown |

Table I-continued

| | Diazo component A—NH₂ | | X = | Coupling Component M¹—H | Colour shade on cotton |
|---|---|---|---|---|---|
| 51. | 3-(-5-)-amino-salicylic acid | 1,3-diaminobenzene | —NH— | 1-amino-8-hydroxy-naphthalene-3,6-disulphonic acid | brown |
| 52. | 2-amino-8-hydroxy-naphthalene-6-sulphonic acid | 1,3-diaminobenzene | —NH— | 1-amino-8-hydroxy-naphthalene-3,6-disulphonic acid | blue |
| 53. | 4-aminobenzene-sulphonic acid | 1,3-diamino-4-methyl-benzene | —NH— | 1-phenyl-5-pyrazolone-3-carboxylic acid | brown |
| 54. | 4-aminobenzene-sulphonic acid | 1,3-diamino-4-methyl-benzene | —NH— | acetoacetic acid 4-carboxyanilide | brown |
| 55. | 4-aminobenzene-sulphonic acid | 1,3-dihydroxybenzene | —NH— | 1-(4-sulpho-phenyl)-3-methyl-5-pyrazolone | brown |
| 56. | 2-aminophenol-4-sulphonic acid | 1,3-dihydroxybenzene | —NH— | 3-methyl-5-pyrazolone | brown |

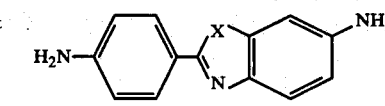

| | Diazo component A—NH₂ | | X = | Coupling Component M¹—H | Colour shade on cotton |
|---|---|---|---|---|---|
| 57. | 2-aminophenol-4-sulphonic acid | 1,3-dihydroxybenzene | —NH— | 2-hydroxybenzoic acid | brown |
| 58. | 2-aminophenol-4-sulphonic acid | 1,3-dihydroxybenzene | —NH— | 1-hydroxy-3-aminobenzene | brown |
| 59. | 2-aminophenol-4-sulphonic acid amide | 1,3-dihydroxybenzene | —NH— | 2-hydroxybenzoic acid | brown |
| 60. | 2-aminophenol | 1,3-dihydroxybenzene-4-sulphonic acid | —NH— | 2-hydroxybenzoic acid | brown |
| 61. | 1-aminobenzene-2,4-disulphonic acid | 1,3-diamino-4-methyl-benzene | —NH— | 1,3-diaminobenzene | brown |
| 62. | 1-aminobenzene-2,4-disulphonic acid | 1,3-diamino-4-methyl-benzene | —NH— | 1-amino-3-hydroxy-benzene | brown |
| 63. | 1-aminobenzene-2,4-disulphonic acid | 1,3-diamino-4-methyl-benzene | —NH— | 1,3-dihydroxy-benzene | brown |
| 64. | 2-aminonaphthalene-6,8-disulphonic acid | 1,3-diamino-4-methyl-benzene | —NH— | 3-cyano-4-methyl-6-hydroxy-2-pyridone | brown |

Table II

| | Diazo component A—NH₂ | Coupling component | X = | Coupling component M¹—H | Colour shade on cotton |
|---|---|---|---|---|---|
| 65. | 4-aminobenzene-sulphonic acid | 1,3-diamino-4-methyl-benzene | O | 2-hydroxybenzenoic acid | orange-brown |
| 66. | 4-aminobenzene-sulphonic acid | 1,3-diaminobenzene | O | 2-hydroxy-3-methyl-benzoic acid | orange-brown |
| 67. | 1-aminonaphthalene-4-sulphonic acid | 1,3-diaminobenzene | O | 2-hydroxybenzoic acid | brown |
| 68. | 4-aminobenzene-sulphonic acid | 1,3-diamino-4-methylbenzene | S | 2-hydroxybenzoic acid | orange-brown |

EXAMPLE 69

(a) 21.4 parts of 2-aminophenol-4-sulphonic acid are stirred with 80 parts of water, 80 parts of ice and 30 parts of 30% aqueous hydrochloric acid and diazotization is carried out at 5°–10° C. with a soluion of 8.4 parts of sodium nitrite in 30 parts of water. After stirring for a further 2 hours, excess nitrous acid is removed with amidosulphonic acid.

12.6 parts of 1,3-dihydroxybenzene dissolved in 100 parts of water are added to the suspension of the yellow diazo compound formed by the diazotization, and the resulting mixture is added, while stirring, to a mixture of 30 parts of sodium hydroxide, 150 parts of water and 50 parts of ice. Stirring is continued for a further few minutes at pH 9–10, yielding a red-brown solution of the monoazo dyestuff formed by this coupling reaction.

The pH of this solution is lowered to 4–5 with 30% aqueous hydrochloric acid and the resulting mixture is stirred with a solution of 28 parts of CuSO₄.5H₂O in 60 parts of water. The pH value of the copper-containing reaction mixture is kept at between 3.5 and 4.5 by adding 20 parts of sodium acetate, and it is stirred for a further 2 hours at 10°–20° C. in order to complete the formation of the copper complex. It is then neutralized with 30% sodium hydroxide solution, 20 g of sodium carbonate are now added and the resulting mixture is added dropwise with stirring to a solution of the diazotized monoazo dyestuff prepared exactly as described in the first paragraph of Example 1. Stirring is continued for a further 3 hours at pH 8–9 in order to complete this coupling reaction. The copper-containing trisazo dye thus obtained is filtered off at pH 5 and air dried at 60° C.

(b) A dye liquor is prepared from 0.2 part of sodium carbonate, 4 parts of sodium sulfate decahydrate and 0.2 part of the dried dye, in a dye beaker held in a water bath.

10 parts of a cotton shirting fabric are kept in continuous motion in the dye liquor and the dyeing temperature is raised to 95° C. where dyeing is carried out for 45 minutes. The dyed cotton fabric is then withdrawn from the dye liquor, adhering liquor is removed by wringing out and rinsing, and the fabric is dried at 60° C. The resulting reddish-tinged brown dyeing is distinguished by good fastness properties, especially by good fastness to washing and perspiration and by excellent fastness to light.

EXAMPLE 70

21.4 parts of 2-aminophenol-4-sulphonic acid are diazotized, coupled with 1,3-dihydroxybenzene and complexed with copper as in Example 69. 50 parts of sodium chloride are then added to the resulting suspension of copper-containing dye and the mixture is filtered.

The dye paste thus filtered off is stirred into 150 parts of water, 200 parts of ice, a solution of 25 parts of sodium carbonate in 70 parts of water is added and to this mixture, is then added with stirring a solution of tetrazotized 2-[4'-aminophenyl]-5 (or 6)-aminobenzimidazole prepared exactly as described in the first paragraph of Example 1.

The one-sided coupling of the tetrazo compound with the copper-containing monoazo dye is complete after stirring for approximately 3 further hours. A solution of 10.9 parts of 1-amino-3-hydroxybenzene in 100 parts of water is then added and stirring is continued, this time for approximately 5 hours. After then adjusting the pH value to 4, the triazo dye thus formed is filtered with suction, and dried. This dye dyes cellulose fibers in brown color shades which are distinguished by good fastness properties, especially by good fastness to light and by good fastness to wahing and perspiration.

EXAMPLE 71

22.4 parts of 2-[4'-aminophenyl]-5 (or 6)-aminobenzimidazole is tetrazotized and coupled with 15.6 parts of 2-hydroxybenzoic acid as in Example 1. To the resulting solution is added, with stirring, a solution of 6-[3'-sulfo-6'-hydroxyphenylazo]-1,3-dihydroxybenzene prepared as described in the first two paragraphs of Example 69.

Stirring is continued for a further 3–4 hours at pH 9. The pH of the mixture is now adjusted to 4–5 with 30% aqueous hydrochloric acid and a solution of 28 parts of $CuSO_4 \cdot 5H_2O$ in 60 parts of water is added, while simultaneously adding 20 parts of sodium acetate. The resulting mixture is heated at 70° C. for approximately 1 hour and the copper-containing trisazo dye thus formed is isolated at 10°–20° C. and pH 4 by filtering.

This dye which can be dried at 70°–80° C., dyes cotton in brown color shades of excellent fastness to light and good fastness to washing and perspiration, and is identical with the dye prepared in Example 69.

Further copper-containing triazo dyestuffs which can be prepared according to the procedure of Examples 69, 70 and 71 and which also display good fastness properties, especially good fastness to light are listed in Table III.

Table III

| | Diazo component A—NH$_2$ | Coupling component (OH / R$_2$ / V') 1,3-dihydroxybenzene | X = | Coupling component M'—H | Colour shade on cotton |
|---|---|---|---|---|---|
| 72. | 2-aminophenol-4-sulphonamide | 1,3-dihydroxybenzene | —NH— | 2-hydroxybenzoic acid | brown |
| 73. | 3-amino-5-sulpho-salicylic acid | 1,3-dihydroxybenzene | —NH— | 2-hydroxybenzoic acid | brown |
| 74. | 2-aminophenol-4-sulphonic acid | 1,3-dihydroxybenzene | —NH— | 2-hydroxy-3-methylbenzoic acid | brown |
| 75. | 2-aminophenol-4-sulphonic acid | 1,3-dihydroxy-4-chlorobenzene | —NH— | 2-hydroxybenzoic acid | brown |
| 76. | 2-aminophenol-4-sulphonic acid | 1,3-dihydroxy-2-chlorobenzene | —NH— | 2-hydroxybenzoic acid | brown |
| 77. | 2-aminophenol-4-sulphonic acid | 1,3-dihydroxy-5-methylbenzene | —NH— | 2-hydroxybenzoic acid | brown |
| 78. | 6-chloro-2-aminophenol-4-sulphonic acid | 1,3-dihydroxybenzene | —NH— | 2-hydroxybenzoic acid | brown |
| 79. | 2-aminophenol-4-sulphonic acid | 1,3-dihydroxybenzene | —NH— | 1-phenyl-5-pyrazolone-3-carboxylic acid | brown |
| 80. | 2-aminophenol-4-sulphonic acid | 1,3-dihydroxybenzene | —NH— | 3-methylpyrazolone | brown |
| 81. | 2-aminophenol-4-sulphonic acid | 1,3-dihydroxybenzene | —NH— | 1-(4-sulphophenyl)-3-methyl-5-pyrazolone | brown |
| 82. | 2-aminophenol-4-sulphonic acid | 1,3-dihydroxybenzene | —NH— | acetoacetic acid 4-carboxyanilide | brown |
| 83. | 2-aminophenol-4-sulphonic acid | 1,3-dihydroxybenzene | —NH— | 3-sulpho-4-methyl-6-hydroxy-2-pyridone | brown |
| 84. | 2-aminophenol-4-sulphonic acid | 1,3-dihydroxybenzene | —NH— | 1,3-diaminobenzene | brown |
| 85. | 2-aminophenol-4-sulphonic acid | 1,3-dihydroxybenzene | —NH— | 1-hydroxy-3-aminobenzene | brown |
| 86. | 2-aminophenol-4-sulphonic acid | 1,3-dihydroxybenzene | —NH— | 1,3-dihydroxybenzene | brown |
| 87. | 2-aminophenol-4-sulphonic acid | 1,3-dihydroxybenzene | —NH— | 2-hydroxynaphthalene-3-carboxylic acid | brown |
| 88. | 2-aminophenol-4-sulphonic acid | 1,3-dihydroxybenzene-4-sulphonic acid | —NH— | 1,3-diamino-4-methylbenzene | brown |
| 89. | 2-aminophenol-4-sulphonic acid | 1,3-dihydroxybenzene-4-sulphonic acid | —NH— | 1-phenyl-3-methyl-5- | brown |

Table III-continued

| | Diazo component A—NH₂ | | —X— | Coupling component M¹—H | Colour shade on cotton |
|---|---|---|---|---|---|
| 90. | 2-aminophenol-4-sulphonic acid | 1,3-dihydroxybenzene-4-sulphonic acid | —NH— | pyrazolone acetoacetic acid anilide | brown |
| 91. | 2-aminophenol-4-sulphonic acid | 1,3-dihydroxybenzene-4-sulphonic acid | —NH— | 3-cyano-4-methyl-6-hydroxy-2-pyridone | brown |
| 92. | 2-aminophenol | 1,3-dihydroxybenzene-4-sulphonic acid | —NH— | 2-hydroxybenzoic acid | brown |
| 93. | 2-aminophenol | 1,3-dihydroxybenzene-4-sulphonic acid | —NH— | 1,3-diamino-benzene-4-sulphonic acid | brown |
| 94. | 2-aminophenol | 1,3-dihydroxybenzene-4-sulphonic acid | —NH— | acetoacetic acid 4-sulpho-anilide | brown |
| 95. | 2-aminophenol | 1,3-dihydroxybenzene-4-sulphonic acid | —NH— | 1-(4-sulpho-phenyl)-3-methyl-5-pyrazolone | brown |
| 96. | 2-aminophenol | 1,3-dihydroxybenzene-4-sulphonic acid | —NH— | 3-sulpho-4-methyl-6-hydroxy-2-pyridone | brown |
| 97. | 2-aminophenol | 1,3-dihydroxybenzene-4-sulphonic acid | —NH— | 1-hydroxynaph-thalene-4-sulphonic acid | brown |
| 98. | 2-aminophenol | 1,3-dihydroxybenzene | —NH— | 1-(4-sulpho-phenyl)-5-pyrazolone-3-carboxylic acid | brown |
| 99. | 2-aminophenol | 1,3-dihydroxybenzene | —NH— | 1-hydroxynaph-thalene-3,6-disulphonic acid | brown |
| 100. | 2-aminophenol | 1,3-dihydroxybenzene | —NH— | 2-hydroxynaph-thalene-3,6-disulphonic acid | brown |

Coupling component $$\text{HO—}\bigcirc\text{(R}_2\text{,V')}$$

$$H_2N—\bigcirc—\overset{X}{\underset{N}{\bigcirc}}—NH_2$$

| | Diazo component A—NH₂ | R₂ V' | X = | Coupling component M¹—H | Colour shade on cotton |
|---|---|---|---|---|---|
| 101. | 2-aminophenol-4,6-disulphonic acid | 1,3-dihydroxybenzene | —NH— | 2-hydroxybenzoic acid | brown |
| 102. | 2-aminophenol-4-sulphonic acid | 1,3-dihydroxybenzene | —O— | 2-hydroxybenzoic acid | brown |
| 103. | 2-aminophenol-4-sulphonic acid | 1,3-dihydroxybenzene | —S— | 2-hydroxybenzoic acid | brown |
| 104. | 2-aminophenol-4-sulphonic acid | 1,3-dihydroxybenzene | —S—, 6-CH₃ | 2-hydroxybenzoic acid | brown |

$$H_2N—\bigcirc—\overset{X}{\underset{N}{\bigcirc}}—NH_2$$

X =

| | | | | | |
|---|---|---|---|---|---|
| 105. | 2-aminophenol-4-sulphonic acid | 1,3-dihydroxybenzene | —O— | 2-hydroxybenzoic acid | brown |
| 106. | 2-aminophenol-4-sulphonic acid | 1,3-dihydroxybenzene | —S— | 2-hydroxybenzoic acid | brown |

EXAMPLE 107

A dyeing on polyamide is obtained as follows: 0.2 parts of the dyestuff of Example 9 prepared according to Example 1 and 2 ml. of a 10% aqueous ammonium acetate solution are filled up in a dyeing apparatus with desalted water to give a volume of 250 ml. and then heated at 40° C. To this dye liquor there are introduced 10 g. Perlon fiber yarn which is dyed at 40° C. for ten minutes. Subsequently, heating is done up to boiling temperature within 10 minutes and the material dyed at this temperature for another 90 minutes. When doing so, 1 ml. of a 3% acetic acid solution is added each time after 30 minutes. The whole is rinsed in cold water until the rinsing water remains clear and the resulting dyeing is dried.

Obtained is an orange dyeing of a great coloring strength having good fastness properties in particular a good fastness to light, washing, water and perspiration.

EXAMPLE 108

A dyeing effected on leather is obtained as follows: 100 g. of freshly tanned and neutralised chrome grain leather are drummed for 30 minutes in a dye liquor of 250 g. of water and 0.5 g. of the dyestuff of Example 62 prepared according to Example 3, at 60° C. in a dyeing vat. The leather is then treated with 2 g. of an anionic fat liquor in the same dyebath for 30 minutes. After drying and dressing the leather in the usual manner, a very level, brown dyeing of great tinctorial strength with good fastness properties, especially good fastness to light and excellent fastness to liquor, fastness to solvents, stability to hard water and toleration of formaldehyde, formic acid and alkali, is obtained.

Obviously many modifications and variations of the present invention are possible in the light of the above teachings. It is, therefore, to be understood that within the scope of the appended claims the invention may be practiced otherwise than as specifically described.

What is claimed:

1. A water soluble trisazo dye having the formula

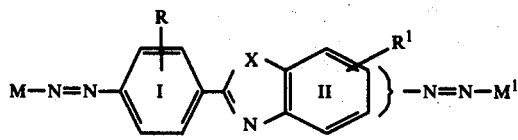

where one of M and M¹ is

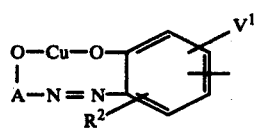

and the other is a benzene or naphthalene coupling component radical containing one or two substituents which are selected from the group consisting of hydroxy and $-NR^6R^7$ groups and said benzene or naphthalene having additionally up to two substituents selected from the group consisting of lower alkyl, lower alkoxy, carboxy, sulfo, chloro, bromo, nitro, and lower alkoxycarbonyl;

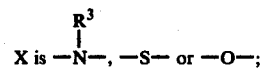

R and R¹ are selected from the group consisting of hydrogen, methyl, and chlorine;

$R^2$ is hydrogen, lower alkyl, lower alkoxy, sulfo, $-NO_2$ or halogen;

$R^3$ is hydrogen, lower alkyl, phenyl or benzyl;

A is the 1,2-phenylene, 1,2-naphthylene or 2,3-naphthylene radical of a diazo component, which can additionally be mono-substituted or di-substituted by substituents selected from the group consisting of chlorine, $-SO_3H$, $-CO_2H$, $-SO_2NH_2$, $-SO_2NHCH_3$, $-SO_2N(CH_3)_2$, $-SO_2N(C_2H_5)$, nitro and alkyl having 1 to 2 carbon atoms;

$V^1$ being $-OH$ or $-NR^4R^5$ and meta-positioned to the copper-containing bridge; each $R^4$ and $R^5$ independently is selected from the group consisting of hydrogen, lower alkyl, phenyl, lower alkylcarbonyl, sulfoalkyl with up to two carbon atoms, hydroxyalkyl with up to two carbon atoms and carboxyalkyl with up to two carbon atoms in the alkyl moiety;

$R^6$ and $R^7$ are independently selected from the group consisting of hydrogen, lower alkyl, aryl having up to 12 carbon atoms, lower alkylcarbonyl, carboxy lower alkyl, sulfo lower alkyl and hydroxy lower alkyl; and the dye contains at least one sulfo or carboxy group present in acid or salt form.

2. The dye of claim 1 in which X is

3. A dye of claim 1 in which $R^2$ is hydrogen and $V^1$ is hydroxy.

4. A dye of claim 1 in which the coupling component radical is the 2-hydroxybenzoic acid radical.

5. A dye of claim 1 wherein A is 4-sulfo-1,2-phenylene.

6. A dye of claim 1 wherein A is 4,6-disulfo-1,2-phenylene.

7. A water soluble trisazo dye having the formula

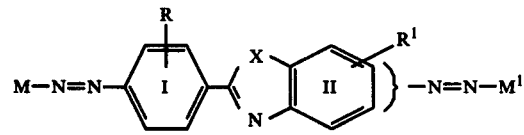

where one of M or M¹ is

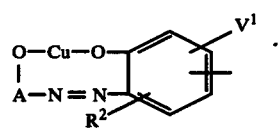

and the other is a coupling component selected from the benzene,
naphthalene, 6-hydroxypyridone, pyrazolone, acetoarylide,
2,4-dihydroxyquinoline and 2,6-di-aminopyridine series;

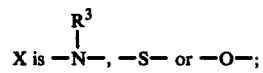

R and R¹ are selected from the group consisting of hydrogen, methyl and chlorine;

$R^2$ is hydrogen, lower alkyl, lower alkoxy, sulfo, $-NO_2$ or halogen;

$R^3$ is hydrogen, lower alkyl, phenyl or benzyl;

A is the 1,2-phenylene, 1,2-naphthylene or 2,3-naphthylene radical of a diazo component, which can additionally be mono-substituted or di-substituted by substituents selected from the group consisting of chlorine, $-SO_3H$, $-CO_2H$, $-SO_2NH_2$, $-SO_2NHCH_3$, $-SO_2N(CH_3)_2$, $-SO_2N(C_2H_5)_2$, nitro and alkyl having 1 to 2 C atoms;

$V^1$ is $-OH$ or $NR^4R^5$ and meta-positioned to the copper-containing bridge; each $R^4$ and $R^5$ independently is selected from the group consisting of hydrogen, lower alkyl, phenyl, lower alkylcarbonyl, sulfoalkyl with up to two carbon atoms, in the alkyl moiety, $R^6$ and $R^7$ is independently selected from the group consisting of hydrogen, lower alkyl, aryl having up to 12 carbon atoms, lower alkylcarbonyl, carboxy lower alkyl, sulfo lower alkyl and hydroxy lower alkyl; and the dye contains at least one sulfo or carboxy group present in acid or salt form.

8. The dye of claim 7 in which $V^1$ is hydroxyl.

9. A dye of claim 7 in which A is a 1,2-phenylene which is unsubstituted or is mono-substituted by $-SO_3H$ or $-SO_2NH_2$.

10. The dye of the formula

11. The dye of the formula
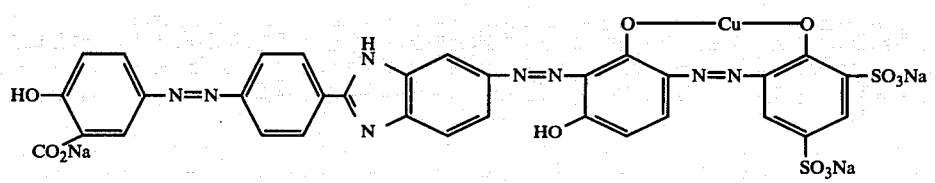
12. The dye of the formula
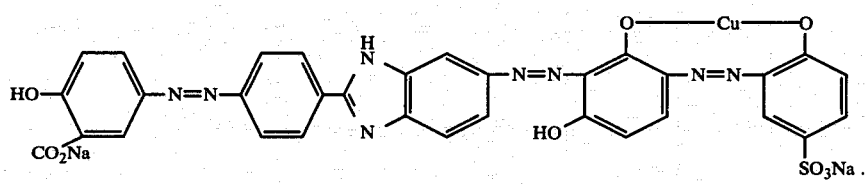
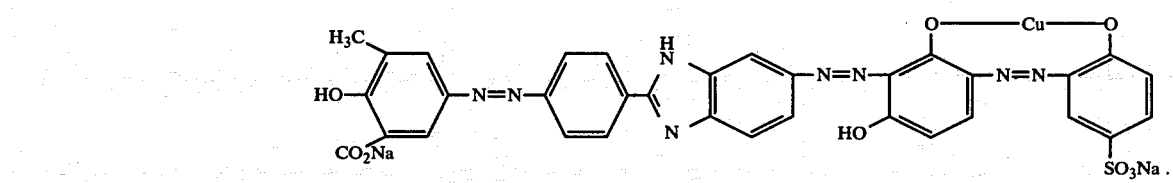
* * * * *